United States Patent [19]

Aoki et al.

[11] Patent Number: 4,864,004

[45] Date of Patent: Sep. 5, 1989

[54] SOLID-STATE POLYMERIZATION OF ACETYLENE

[75] Inventors: Katsutoshi Aoki, Arakawa; Shuzo Fujiwara, Tsukuba; Katsumi Tanaka, Tsukuba; Yozo Kakudate, Tsukuba; Masatake Yoshida, Tsukuba; Shu Usuba, Tsukuba, all of Japan

[73] Assignee: Japan as represented by Director General of Agency of Industrial Science and Technology, Tokyo, Japan

[21] Appl. No.: 165,984

[22] Filed: Mar. 9, 1988

[30] Foreign Application Priority Data

Mar. 31, 1987 [JP] Japan ................................. 62-79515

[51] Int. Cl.$^4$ .................... C08F 2/36; C08F 138/02
[52] U.S. Cl. ...................................... 526/73; 526/77; 526/285
[58] Field of Search ............................ 526/285, 77, 73

[56] References Cited

FOREIGN PATENT DOCUMENTS 48-32581 10/1973 Japan ................................ 526/285

OTHER PUBLICATIONS

Ito et al., Simultaneous Polymerization and Formation of Polyacetylene Film on the Surface of Concentrated Soluble Ziegler-Type Catalyst Solution, J. Polym. Sci., Polym. Chem. Ed., 12, 11–20 (1974).

Primary Examiner—Joseph L. Schofer
Assistant Examiner—F. M. Teskin
Attorney, Agent, or Firm—Wenderoth, Lind & Ponack

[57] ABSTRACT

Acetylene can be polymerized into a polyacetylene by a solid-state polymerization reaction when it is compressed into a solid under a high pressure of, for example, 1 GPa or higher. The polyacetylene product is obtained in a bulky transparent form in contrast to conventional polyacetylenes in a fibrous form prepared by utilizing a Ziegler-Natta catalyst, and free from impurities because neither catalyst nor solvent is used in the reaction.

1 Claim, No Drawings

SOLID-STATE POLYMERIZATION OF ACETYLENE

BACKGROUND OF THE INVENTION

The present invention relates to a method for the preparation of polyacetylene or, more particularly, to a method for the preparation of high-purity polyacetylene in a bulky form by solid-state polymerization reaction.

It is well known and widely practiced to prepare polyacetylene or polymer of acetylene by the catalytic polymerization reaction of acetylene conducted on the surface of an organic solution of a so-called Ziegler-Natta catalyst, in which the polymerization reaction proceeds at or in the vicinity of the gas-liquid interface [see, for example, T. Ito et al., Journal of Polymer Science, Polymer Chemistry Edition, volume 12, page 11 (1974)].

The polymer of acetylene in this prior art method is obtained in the form of a film composed of a loose web of fibrils having a diameter of several tens of nanometers. Such a web of fibrils or felt-like film naturally contains void spaces between the fibrils so that the polymer film has a low bulk density of only one third to a half of the true density thereof [see, for example, J. C. W. Chien et al., Journal of Polymer Science, Polymer Letter Edition, volume 20, page 97 (1982)] and the film can never have high transparency.

Another problem in the above mentioned catalytic polymerization reaction is that the polymer as prepared necessarily contains considerable amounts of the metals as the constituents of the catalyst, organic solvent and the like as impurities. Purification of the polymer by completely removing the impurities is an extremely difficult matter because the impurities chemically included in the fibrils cannot be washed out by a washing treatment although the impurities physically contained in the spaces between the fibrils may possibly be removed. Thus, there has been no prior art method which produces polyacetylene having a sufficiently high purity.

SUMMARY OF THE INVENTION

The present invention accordingly has an object to provide a novel method for the preparation of polyacetylene free from the above mentioned problems and disadvantages in the conventional polyacetylenes prepared by the prior art method. The investigatins extensively undertaken with this object have led to a discovery that, quite unexpectedly, acetylene is subject to solid-state polymerization under high pressure to give polyacetylene in a bulky form and without impurities.

The method of the present invention for the preparation of polyacetylene comprises a solid-state polymerization of acetylene under high pressures above 1 GPa. The solid-state polymerization is preceded by a step of purification of the starting acetylene monomer through phase transition from the liquid phase to the solid phase.

DETAILED DESCRIPTION OF THE PREFERRED EMBODIMENTS

Needless to say, the stale phase of acetylene is a gas at room temperature and under atmospheric pressure. It is usual that acetylene as the starting material of polyacetylene is introduced into a pressurizable reaction vessel in a liquid form by compressing the gas under a pressure of several hundred kilopascals at room temperature. Alternatively, acetylene gas is introduced into the reaction vessel chilled at $-81°$ C., i.e. the solidification point of acetylene, or below so that the introduced gas solidifies immediately in the vessel. In either case, the temperature and pressure are controlled so as to keep the acetylene liquid in the vessel.

Thereafter, the pressure on the liquid acetylene is gradually increased up to a solidification pressure $P_s$, at which precipitation of crystals of acetylene takes place. According to the experimental results, the solidification pressure $P_s$ in the unit of GPa is given approximately by the equation $P_s = 0.55 + 0.0068T$ as a function of temperature T in °C. This solidification process leads to purification of the acetylene because impurities in the liquid acetylene, e.g., acetone, methane, etc., are excluded from the growing crystals forming separate phases. When acetylene crystals of high purity are desired, it is important in this regard that the growth of crystals proceeds at a velocity as low as possible by carefully controlling the pressure.

After completion of the liquid-solid phase transition of acetylene, the pressure on the solid acetylene is further increased so that the solid-state polymerization of acetylene is initiated at a certain pressure, which is referred to as the initiation pressure for the polymerization reaction, $P_p$, hereinafter. According to the experimental results, the initiation pressure $P_p$ in the unit of GPa is given approximately by the equation $P_p = 4.0 - 0.025T$ as a function of temperature T in °C. in the range from $-200°$ C. to $+100°$ C. although determination of the initiation pressure $P_p$ is unavoidably accopanied by indefiniteness in comparison with the solidification pressure $P_s$. The reaction rate of the solid-state polymerization is relatively low. The reaction is completed usually within several hours to some ten hours though dependent on the temperature and pressure. After completion of the polymerization reaction, which can readily be detected by the disappearance of the Raman peaks of acetylene molecule, the pressure in the reaction vessel is gradually released to atmospheric pressure. A transpaent dark red solid recovered in a bulky form in the vessel can be identified to be polyacetylene from the Raman spectra according to the teaching given by I. Harada et al. in Journal of Chemical Physics, volume 73, page 4764 (1980).

It is noted that the pressure applied to the reacting acetylene monomer should not be excessively high. For example, the pressure is preferably in the range from the initiation pressure, $P_p$, to 1.5 times of its value. This limitation is based on the discovery that, at extremely high pressures, the solid-state polymerization is accompanied by another polymerization reaction as a side reaction so that the product may eventually be a mixture of the desired polyacetylene and undesired polymers having a structure different from that of polyacetylene.

As is understood from the above description, the method of the present invention has several advantages over the prior art methods. Firstly, the product of polyacetylene is obtained in a bulky and transparent form having a bulk density close to the true density as a result of the solid-state polymerization reaction under high pressure. Secondly, the product of polyacetylene has a high purity even without an elaborated purification process of the starting acetylene gas prior to polymerization because the purification of the starting material can be conducted in the reaction vessel through the liquid-solid phase transition. Thirdly, the product of polyacetylene inherently having a high purity requires no chemical washing treatment because the polymerization is conducted under conditions free from the chance of contamination with any impurities as a consequence of the absence of any catalyst and solvent in the solid-state polymerization reaction.

In the following, the method of the present invention is described in more detail by way of an example.

EXAMPLE

A high-pressure cell of diamond-anvil type was chilled by using liquid nitrogen at a temperature of −81° C., i.e. the solidification temperature of acetylene under normal pressure, or below. Acetylene gas of a purity 99.7% was condensed in a small sample chamber with a diameter of 0.5 mm and a height of 0.3 mm. After the white powdery acetylene was enclosed and pressurized up to a few megapascals at low temperature, the high pressure cell was warmed to room temperature. The solid acetylene melted in the course of temperature elevation. The pressure was gradually increased at room temperature. At about 0.7 GPa, a liquid-solid transition accompanying growth of a colorless and transparent crystal was observed in the liquid. After the transition was completed, the pressure was further increased. A color change from colorless transparent to red occurred at 3.5 GPa indicating formation of polyacetylene by the solid-state polymerization reaction. The reaction was completed after about 10 hours; Raman peaks due to the vibration of acetylene molecules was not detected any longer. The transparent red solid thus obtained was able to be identified to be polyacetylene from the Raman spectra taken at the reaction pressure.

The pressure on the high-pressure cell was released to atmospheric pressure and the product was taken out of the cell. The Raman spectra taken for the recovered product showed more closely that polyacetylene was synthesized by the solid-state polymerization.

The experimental procedure described above was repeated in a similar manner but at temperatures of 100° C. and −196° C. The results showed that polyacetylene was prepared at about 1.5 GPa at 100° C. and at about 9 GPa at −196° C.

The high pressure preparations of polyacetylene at room temperature were made in the same manner as above for acetylene gases having volume-based purities of 99.9999% and 99%, of which the principal impurity was acetone. The polymerization reactions were initiated at about 3.5 GPa irrespective of the purity of the starting acetylene gas. The Raman measurement of these products indicated that there was no noticeable difference in the Raman profile between the polyacetylenes prepared from 99.7%-pure and 99.9999%- or 99%-pure acetylene gases.

In the above description of the experiments, the pressure was determined from the peak shift of the sharp fluorescence line of ruby, $d\lambda/dP=2.746$ nm/GPa.

What is claimed is:

1. A method for the preparation of polyacetylene which comprises compressing acetylene under a pressure sufficiently high to keep the acetylene in a solid phase to effect a solid-state polymerization of acetylene, said pressure exceeding the initiation pressure $P_p$ expressed in units of GPa as a function of temperature in °C. by the equation $P_p = 4.0 - 0.025T$ and wherein $T = -200°$ C. to $+100°$ C.

* * * * *